United States Patent [19]
Lee et al.

[11] 3,828,170
[45] Aug. 6, 1974

[54] COMFORT LEVEL MEASURING DEVICE
[75] Inventors: Richard A. Lee, Warren; William F. Lins, East Detroit, both of Mich.
[73] Assignee: The United States of America as represented by the Secretary of the Army, Washington, D.C.
[22] Filed: Dec. 27, 1972
[21] Appl. No.: 318,956

[52] U.S. Cl.................. 235/151.3, 73/67, 340/261
[51] Int. Cl........................ G06g 7/60, G01p 15/00
[58] Field of Search ............... 73/67, 67.2, 67.3, 70, 73/71, 71.2, 71.4, 488, 489, 503, 506, 510, 517 R, DIG. 1; 235/151.3, 151.32; 324/162; 340/261

[56] References Cited
UNITED STATES PATENTS
3,466,431  9/1969  Fuchs et al. ..................... 235/151.3

Primary Examiner—Malcolm A. Morrison
Assistant Examiner—R. Stephen Dildine, Jr.
Attorney, Agent, or Firm—Edward J. Kelly; Herbert Berl; John Schmidt

[57] ABSTRACT

An objective means to determine the comfort level of vibrations to which human beings must be subjected. The device is one or more absorbed power measuring circuits connected to receive one or more voltage signals from an accelerometer mounted on the seat supporting the human being. Each absorbed power measuring circuit comprises a weighting function circuit, a squaring circuit, and an averaging circuit in series, with the output summed and metered to give total average absorbed power for the human on the seat.

12 Claims, 8 Drawing Figures

COMFORT LEVEL MEASURING DEVICE

The invention described herein may be manufactured, used, and licensed by or for the Government for governmental purposes without payment to us of any royalty thereon.

BACKGROUND OF THE INVENTION

1. Field of the Invention

The invention relates to means for making objective determinations regarding the effect of machine vibrations on personnel stationed on the machine and subjected to the vibrations.

2. Description of the Prior Art

So far as applicants are aware, there are in the prior art no truly objective means suitable for field use to determine the effect a vibrating support will have on a human being stationed on the support, and thus required to tolerate the vibrations. The best prior art known to applicants is set forth in such publications as ASME Paper, *Theory of Human Vibration Response*, Paper No. 66-WA/BHF-15, by Fred Pradko, Richard A. Lee, and Victor Kaluza, presented at the New York City meeting Nov. 27-Dec. 1, 1966; SAE Paper No. 680091, titled *Analytical Analysis of Human Vibration*, by Richard A. Lee and Fred Pradko, SAE Transactions, Vol. 77, Sec. 1 (1968); and references cited therein, and cited in *Motion Simulation and Its Application to Ride Dynamics Research*, by W. F. Lins and H. Dugoff, SAE Paper No. 720003, presented at a Detroit meeting Jan. 10 – 14, 1972. The SAE Paper No. 720003 is not cited as prior art insofar as it discloses elements of this invention.

The prior art here cited indicates that human comfort (or discomfort) is a function of the power absorbed by the human who is subjected to the vibration of the support on which said human is carried and, of course, the support receives its vibration from the equipment on which it is mounted. Moreover, the prior art also indicates that absorbed power can be evaluated (or measured) with a reasonable degree of accuracy and reliability. See especially the above-referenced SAE Paper No. 680091.

The problem with the prior art lies primarily in the fact that it appears to be limited largely to laboratory applications, when what is needed is a device that is rugged enough to be bounced around in a jeep or in the equipment locker of a personnel carrier, and is still fully functional and reliable when used in the field.

SUMMARY OF THE INVENTION

The invention takes a voltage signal proportional to the acceleration which results from the vibration to which the human necessarily is subjected, and converts that signal to average absorbed power registered on a suitable meter. To produce such a reading, the device feeds the signal to a weighting function circuit for weighing the acceleration as a function of frequency; the output of the weighting function circuit is squared in a squaring circuit, and then that output is averaged and metered to indicate average power absorbed by an average human being subjected to the vibration. When vibrations occur along two or more axes, a weighting function circuit is provided for each axis and the averaged outputs of the squaring circuits are totalled in a summing circuit which feeds its signal to suitable means to indicate or record the total average power absorbed by the human being subjected to the two or more vibrations.

IN THE DRAWINGS

DESCRIPTION OF THE PREFERRED EMBODIMENT

The above-identified prior art, SAE Paper No. 680091, printed in the SAE Transactions, Vol. 77, Sec. 1 (1968) is hereby incorporated by reference for those who wish to have a more thorough understanding of the origins of the "absorbed power" theory. Attention is invited to a typographical error in that paper: in the equation for $F_4$ on page 6, the number appearing there as 0.5172811 has a digit missing, and should read 0.51724811 to be correct.

Figure 7:
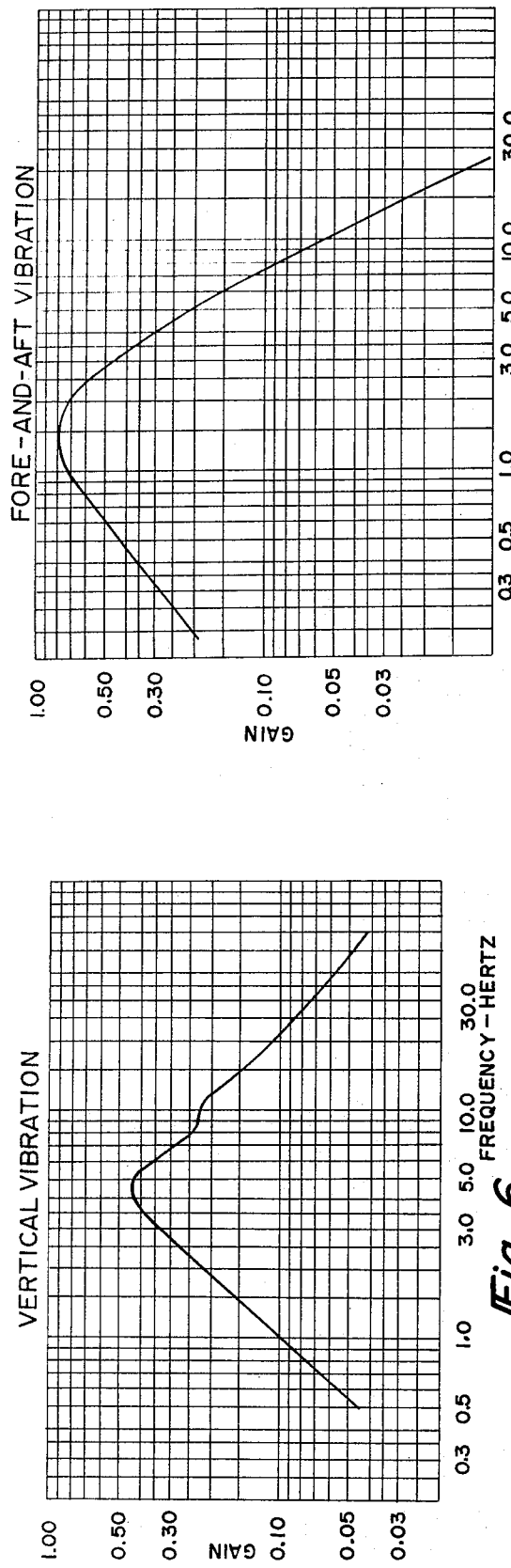
FIG. 7 is a graphic representation of a family of circuits, any one of which will provide the fore-and-aft weighting function, and of which the circuit shown in FIG. 4 is an example.

Also incorporated by reference is SAE Paper No. 720003, identified above. However, the disclosure herein provided is considered sufficient to enable those skilled in the art to practise the invention. It is noted that the terminology in this patent application differs slightly in one respect from that of the paper: whereas the SAE paper refers to a "Human Response Function," we consider it more apt to refer to a "Weighting Function;" see especially FIG. 7 of the SAE paper, and FIG. 2 of this disclosure.

Figure 1:
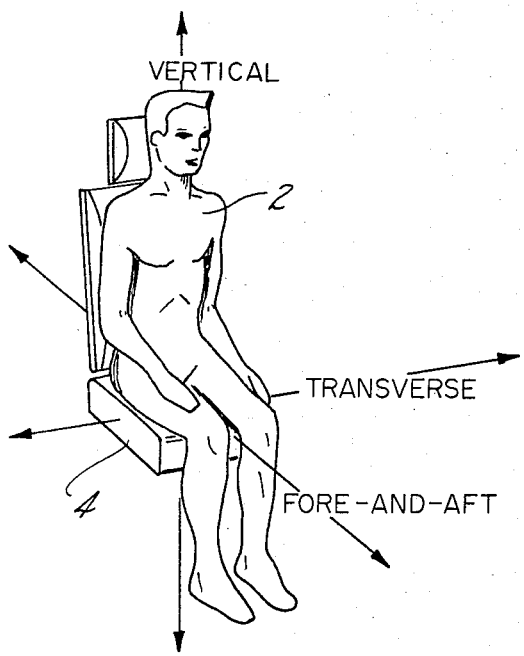
FIG. 1 is a schematic view of a seated human figure to illustrate the vertical, fore-and-aft, and transverse coordinate axes usually involved in operator-endurance problems.
Figure 2:
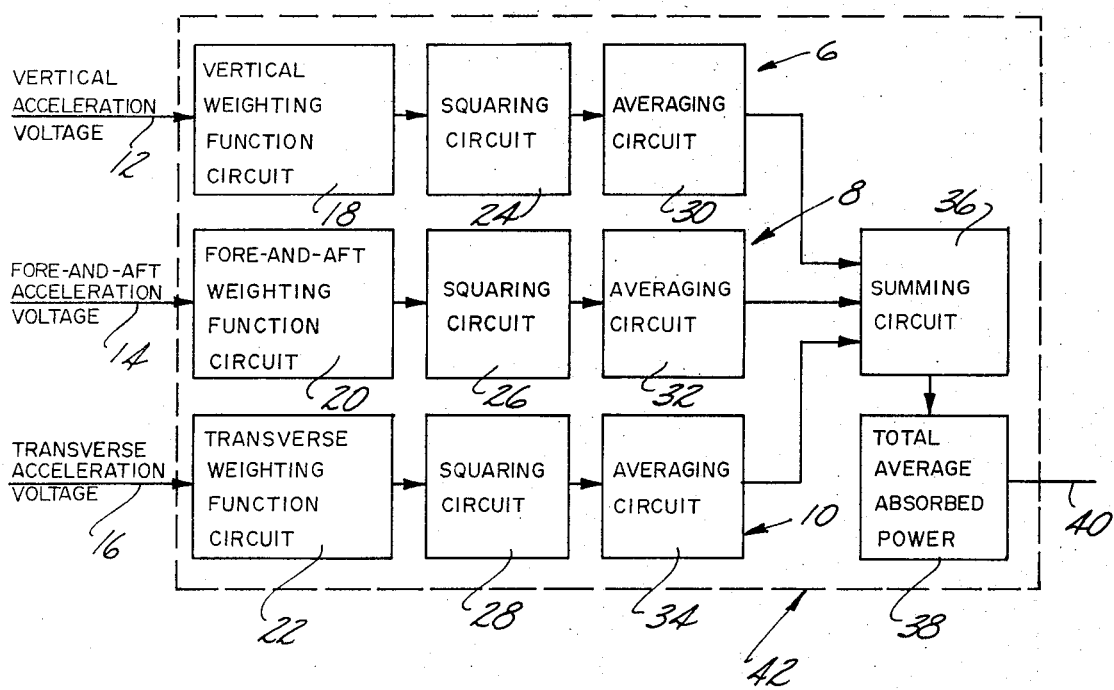
FIG. 2 is a diagram of the computer circuits in a device embodying this invention.

FIG. 1 shows a human FIG. 2 in a seated position, with the three significant coordinate axes shown as the vertical, fore-and-aft, and transverse (side-to-side). The seated position is indicated because it is the customary corporal attitude of human operators of equipment and of human passengers.

The vertical axis of vibration is significant because most of the shocks to which human operators and passengers of equipment are subjected have their origin in the irregularities of the terrain traversed, as cushioned by vehicle wheel suspensions, spring seats, and the like.

The fore-and-aft axis is significant because of starting and stopping forces, which contribute substantially to the fatigue (comfort level) of human beings on the equipment. Transverse forces are significant because terrain irregularities are likely to affect one side at a time, causing a tipping of the vehicle and introducing a transverse component. It is recognized that many of these forces are angular, but the angle is usually small and the radius large, with the result that the significant vibration in terms of human comfort may be considered as linear.

A comfort level measuring device made according to this invention depends upon a signal initiated by the support 4 which carries the human being, and that is usually a seat of some sort. In the embodiment of the invention here shown, it is contemplated that the support 4 is adapted to produce a voltage signal which is proportional to the acceleration which is a result of vibration of the support. We have found it expedient to break the total vibration of said support into the three components represented by the three coordinate axes shown in FIG. 1 and discussed above.

Such a voltage signal is conventionally generated by an accelerometer, such for example as the one disclosed and claimed in U.S. Pat. 3,528,297 issued Sept. 15, 1970 to Richard A. Lee and assigned to the U.S. One such accelerometer may be provided for each of the illustrated coordinate axes, or a suitably oriented (vertical, fore-and-aft, and transverse) triaxial accelerometer may be used.

The accelerometer is secured to the seat 4 or other support on which the human being is immediately mounted or carried because the support vibrations are the source of physical input which contributes to the human's comfort (or, negatively, his discomfort). When the support is resiliently cushioned, the subject (or an appropriate inanimate weight) should rest (sit on) the accelerometer.

We recognize that other inputs can and do affect human comfort, such as noise, visual contacts and the like; moreover, psychological inputs such as the anxiety attendant upon the approach to a combat zone by troops being transported to the front may well have a greater impact on physical comfort than a rough ride in a troop transport. However, it is the object of our invention herein disclosed and claimed to measure comfort levels as determined by physical vibration inputs to the human body mounted on the support.

As is pointed out in the referenced SAE papers, human comfort is a function of the power absorbed by the body subjected to the vibrations of its support. Moreover, a firm, muscular body absorbs less power than a flabby or obese body. The indicated absorbed power as shown by our device is based on an average, exemplified by a 150 pound male about 28 years old. Because it is our object to determine the comfort levels of military equipment, it may be assumed that the average military man is probably in better physical condition than his civilian counterpart. These factors will be taken into consideration in adapting the comfort level measuring device to civilian applications. Such adaptation is usually attainable in the calibration of the instrument showing total average absorbed power.

FIG. 2 shows three absorbed power circuits 6, 8 and 10 adapted to read power absorbed along three axes of vibration shown as vertical, fore-and-aft, and transverse, respectively. The vertical voltage signal input conductor is shown at 12, the fore-and-aft conductor at 14, and the transverse conductor at 16.

The vertical, fore-and-aft, and transverse weighting function circuits are shown in the block diagram of FIG. 2 at 18, 20 and 22 respectively, connected to receive their respective acceleration voltages. The outputs of the weighting function circuits become the inputs to squaring circuits 24, 26, and 28 which simply square the input signal in each case. The outputs of squaring circuits 24, 26 and 28 are fed into averaging circuits 30, 32, and 34 respectively, and these feed their outputs to a summing circuit 36.

The summing circuit output is converted into total average absorbed power, which can be provided as a computer print-out if desired. However, since a principal object of our invention is a field-usable device, a preferred final element 38 is a meter which is read directly, or a strip chart recorder having an output 40 which is the chart itself.

The vertical weighting function circuit 18 may be any one of a family of circuits satisfying the relationship;

$$[15.453S(S+5.0)(S^2+28.3S+2800)(S^2+105.0S+7570)]/[(S+6.0)(S^2+29.8S+1000)(S^2+39.1S+3800)(S^2+125.0S+5180)]; \quad (1)$$

the fore-and-aft weighting function circuit 20 may be any one of a family of circuits satisfying the relationship;

$$209.0S(S+110.0)/(S^2+17.6S+125.0)(S^2+110.0S+1300); \quad (2)$$

and the transverse weighting function circuit 22 may be any one of a family of circuits satisfying the relationship $$478.0S(S+130.0)(S^2+11.2S+60.0)(S^2+14.2S+260.0)/(S^2+3.33S+17.0)(S^2+5.5S+140.0)(S^2+44.0S+900.0)(S^2+255.0S+2500). \quad (3)$$

In each of these three relationships, $S$ is an operator which transforms differential equations from the time domain into the complex frequency domain.

Figure 3:
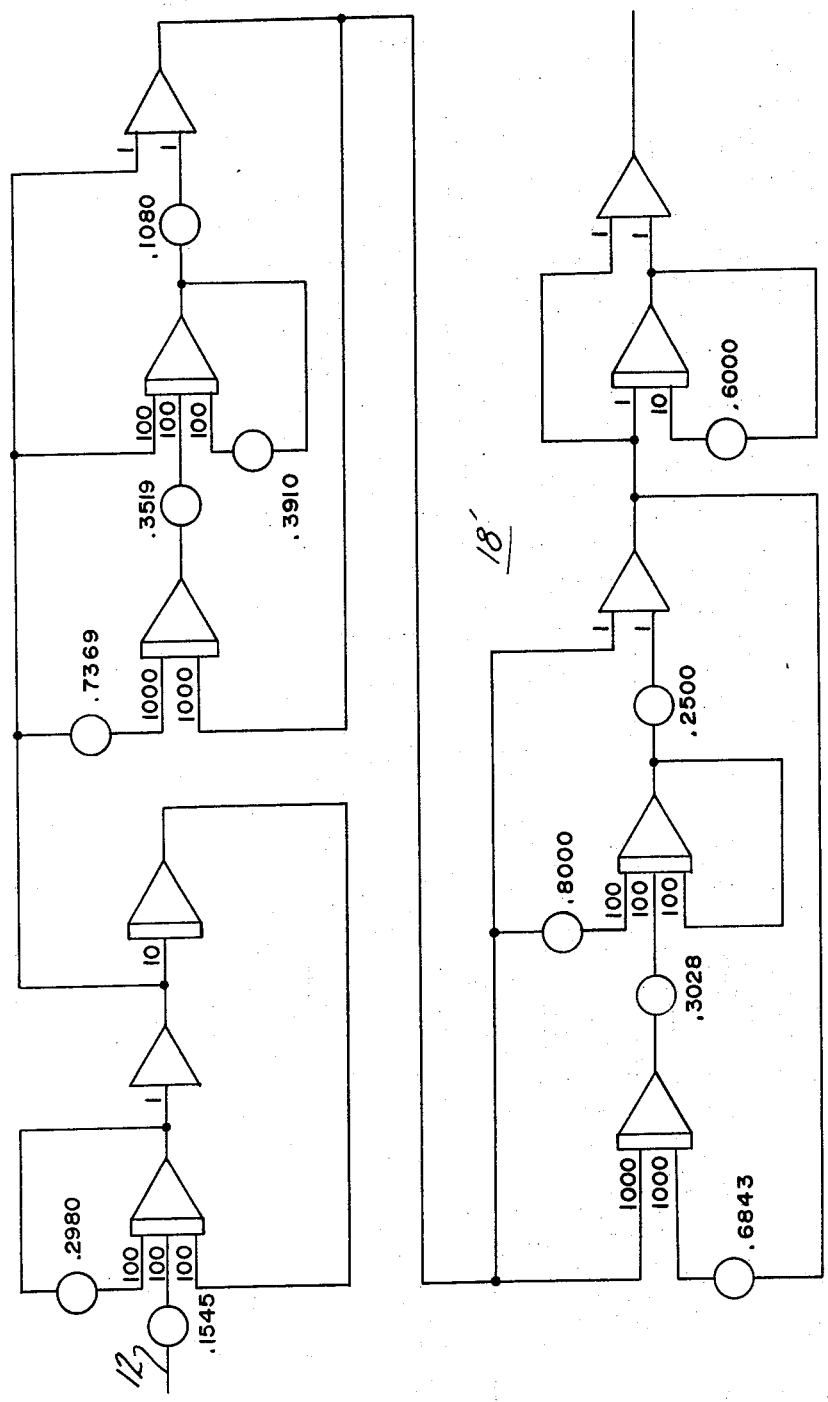
FIG. 3 is a vertical weighting function circuit diagram such as is shown schematically in FIG. 2.
Figure 4:
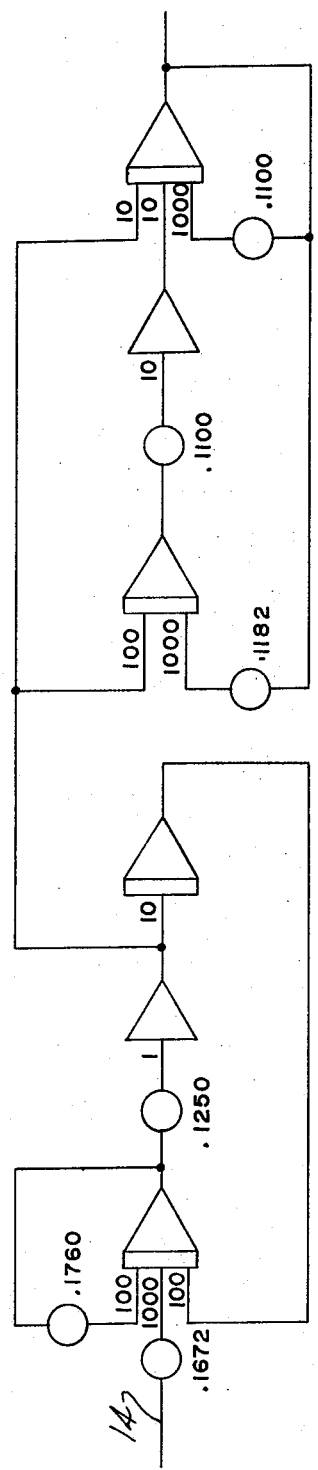
FIG. 4 is a fore-and-aft weighting function circuit diagram such as is shown schematically in FIG. 2.
Figure 5:
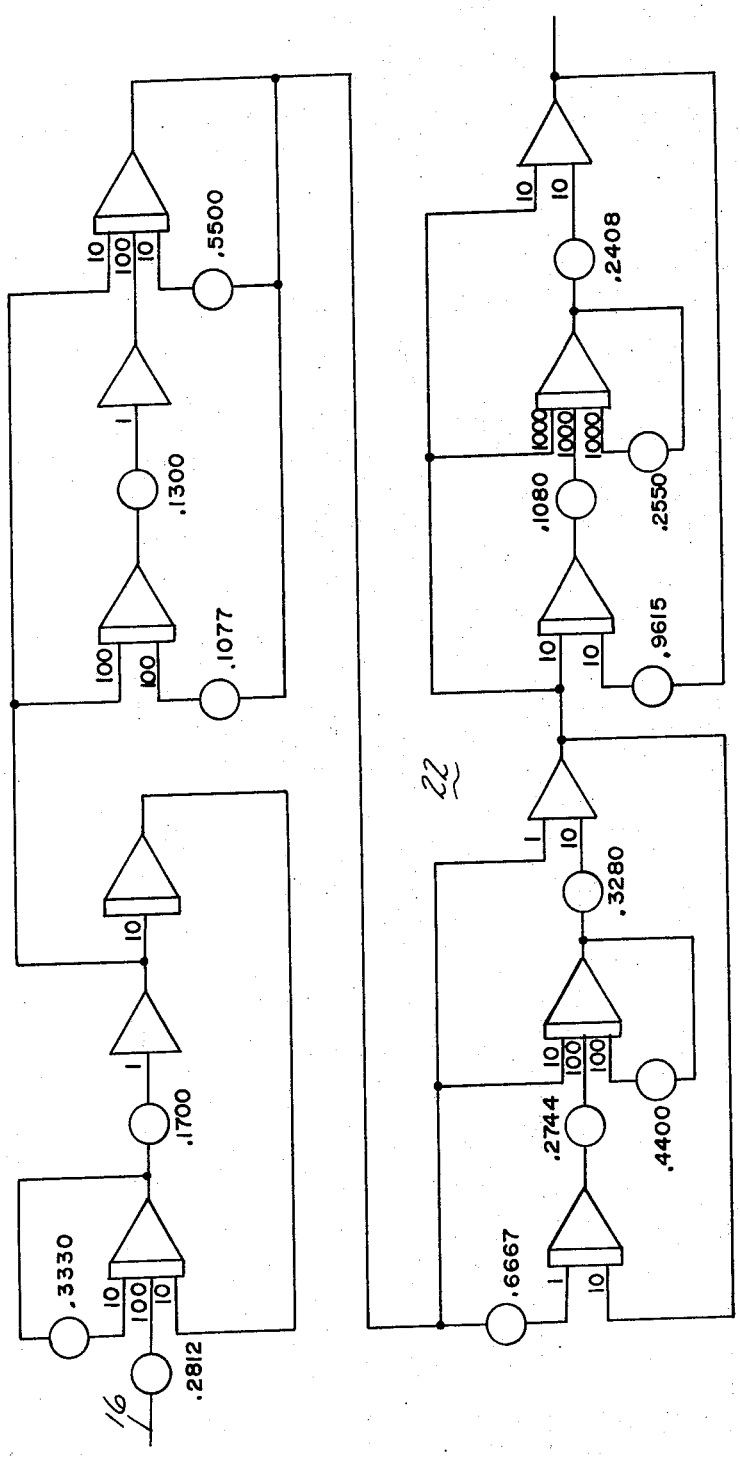
FIG. 5 is a transverse (side-to-side) weighting function circuit diagram such as is shown schematically in FIG. 2.

FIGS. 3, 4, and 5 show weighting function circuits 18', 20', and 22' which are examples of the families of circuits satisfying the relationships (1), (2), and (3) respectively shown above and indicated schematically by the blocks 18, 20, and 22 respectively in FIG. 2. In each of the circuit diagrams shown in FIGS. 3, 4 and 5, each element shown as a circle is a potentiometer, each element shown as a simple triangle is an amplifier, and each triangle having a rectangle attached to one side is an integrator.

Regarding the potentiometers shown, each "pot" (potentiometer) is shown with a decimal fraction, which represents the ratio of output to input, i.e., the output voltage is $x$ times the input voltage, $x$ being the indicated decimal fraction.

Concerning amplifiers and integrators, in each of these the sign is changed: if the input is positive, the output is negative, and vice versa. The numeral associated with each input represents the gain for that input as the signal passes through the amplifier or integrator.

Figure 8:
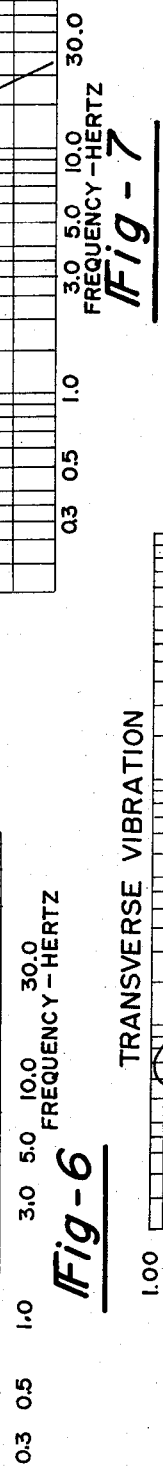
FIG. 8 is a graphic representation of a family of circuits, any one of which will provide the transverse (side-to-side) weighting function, and of which the circuit shown in FIG. 5 is an example.
Figure 6:
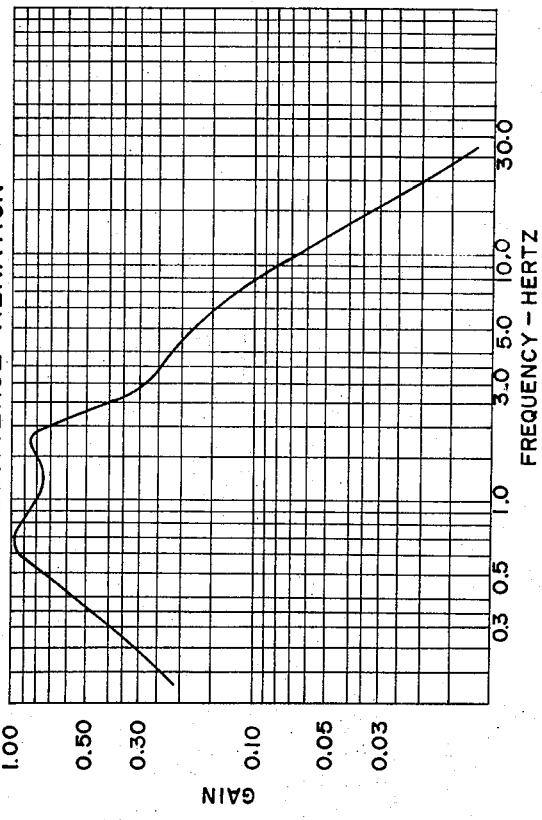
FIG. 6 is a graphic representation of a family of circuits, any one of which will provide the vertical weighting function, and of which the circuit shown in FIG. 3 is an example.

Reference is now made to the three relationships set forth above for the weighting function circuits 18, 20 and 22. Those three relationships are shown graphically in the three curves given in FIGS. 6, 7 and 8 respectively. It will be understood that each curve represents a family of circuits that can be assembled to measure the comfort level for vibration along the axis indicated.

OPERATION

It will be understood by those skilled in the art that each of the absorbed power circuits 6, 8, and 10 is useful by itself in specialized situations wherein two of the axial vibrations are so small as to be insignificant, or they may be missing entirely. Or, any two of the three absorbed power circuits may be used together where the third one is not needed because one of the axial directions of vibration is missing or is insignificant.

The device shown in FIG. 2 can be packaged in any way that suits the convenience (or needs) of the user. Because the total device of FIG. 2 includes all three circuits capable of measuring the power that will be absorbed by an "average" person subjected simultaneously to vibrations along the three axes shown in FIG. 1, it will be expedient to package the total device shown in FIG. 2 for such situations.

However, it should also be noted that the device of FIG. 2 measured the power absorbed by an "average" person subjected to random vibrations of all types, i.e., it is not limited to vibrations originating along the three axes shown in FIG. 1. This is true because the FIG. 2 device is able to, and does, analyze the random vibrations by breaking them down into the three components shown in FIG. 1, regardless of the origin of the vibrations.

In a field application of this invention, the total device shown in FIG. 2 and indicated generally by the reference character 42 is connected to receive the voltage signal outputs 12, 14, and 16. Depending on how the equipment package is designed, one polarized jack from a tri-axial accelerometer placed on the seat is plugged into device 42, where device 42 is designed with a suitable socket to receive such a jack; or alternatively, three accelerometers are individually plugged into separate suitably labelled sockets provided in the box which houses device 42.

A cross-country vehicle popularly known as the Gama Goat, shown in U.S. Pat. No. 3,183,991 and issued to Roger L. Gamaunt May 18, 1965, may be taken as an example of a military personnel carrier, wherein the rear body shown at 15 of FIG. 4 of the Gamaunt patent is provided with two rows of bench seats facing each other. For test purposes, the personnel carrier is run over numerous "courses", such as a section of Belgian block pavement, or corduroy road, for example, and the absorbed power output is read on wattmeter 38 (FIG. 2 of this invention).

We have found that six watts is the approximate upper limit of endurance of troops riding in such circumstances. When the absorbed power exceeds 6 watts, the troops are very likely to shout, "Hey, slow down" to the driver. However, such a figure is not absolute. For example, assume travel along a path some of which may be under enemy surveillance and thus subject to enemy fire. To pass quickly through such a fire zone, the troops would doubtless willingly endure a much higher absorbed power.

Conversely, a rough ride which people might willingly endure while riding in a truck simply because they expect a rough ride in those circumstances would doubtless be totally unacceptable in a standard passenger automobile. The absorbed power meter shown schematically at 38 is insensitive to such psychological factors.

From the foregoing, those skilled in the art will readily comprehend the operation of one of the absorbed power circuits 6, 8 and 10, or of any two, and such a utilization of our invention need therefore not be detailed here.

We wish it to be understood that we do not desire to be limited to the exact details of construction shown and described, for obvious modifications will occur to a person skilled in the art.

What is claimed is:

1. A device to measure the human comfort level resulting from the vibrations of a support for a human being wherein the support is adapted to produce voltage signals each of which is proportional to the acceleration along one of vertical, fore-and-aft, and transverse axes, the device comprising:
   a. means to compute the power absorbed by said human due to vertical acceleration and having
      i. a weighting function circuit for weighing the acceleration as a function of frequency,
      ii. means for feeding the vertical acceleration voltage signal to the input of the weighting function circuit,
      iii. a squaring circuit connected to receive the output of the weighting function circuit, and
      iv. an averaging circuit connected to receive the output of the squaring circuit;
   b. means to compute the power absorbed by said human due to fore-and-aft acceleration and having
      i. a seocnd weighting function circuit for weighing the acceleration as a function of frequency,
      ii. means for feeding the fore-and-aft acceleration voltage signal to the input of the second weighting function circuit,
      iii. a squaring circuit connected to receive the output of the second weighting function circuit, and
      iv. an averaging circuit connected to receive the output of the second-named squaring circuit;
   c. means to compute the power absorbed by said human due to transverse acceleration and having
      i. a third weighting function circuit for weighing the acceleration as a function of frequency,
      ii. means for feeding the transverse acceleration voltage signal to the input of the third weighting function circuit,
      iii. a squaring circuit connected to receive the output of the third weighting function circuit, and
      iv. an averaging circuit connected to receive the output of the third-named squaring circuit;
   d. means for receiving the outputs of all of said averaging circuits and for summing the three outputs into one summing circuit output; and
   e. means for indicating the total average power absorbed by said human because of subjection to the vibrations of said support.

2. A device as in claim 1, wherein the first-named weighting function circuit is a circuit determined by the transfer function $$\frac{15.453S(S+5.0)(S^2+28.3S+2800)(S^2+105.0S+7570)}{(S+6.0)(S^2+29.8S+1000)(S^2+39.1S+3800)(S^2+125.0S+5180)}$$

in which $S$ is an operator which transforms differential equations from the time domain into the complex frequency domain.

3. A device as in claim 2, wherein the second-named weighting function circuit is a circuit determined by the transfer function $$\frac{209.0S(S+110.0)}{(S^2+17.6S+125.0)(S^2+110.0S+1300)}$$

in which $S$ is an operator which transforms differential equations from the time domain into the complex frequency domain.

4. A device as in claim 3, wherein the third-named weighting function circuit is a circuit determined by the transfer function $$\frac{478.0S(S+130.0)(S^2+11.2S+60.0)(S^2+14.2S+260.0)}{(S^2+3.33S+17.0)(S^2+5.5S+140.0)(S^2+44.0S+900.0)(S^2+255.0S+2500)}$$

in which $S$ is an operator which transforms differential equations from the time domain into the complex frequency domain.

5. A device as in claim 1, wherein the second-named weighting function circuit is a circuit determined by the transfer function $$\frac{209.0S(S+110.0)}{(S^2+17.6S+125.0)(S^2+110.0S+1300)}$$

in which $S$ is an operator which transforms differential equations from the time domain into the complex frequency domain.

6. A device as in claim 5, wherein the third-named weighting function circuit is a circuit determined by the transfer function $$\frac{478.0S(S+130.0)(S^2+11.2S+60.0)(S^2+14.2S+260.0)}{(S^2+3.33S+17.0)(S^2+5.5S+140.0)(S^2+44.0S+900.0)(S^2+255.0S+2500)}$$

in which $S$ is an operator which transforms differential equations from the time domain into the complex frequency domain.

7. A device as in claim 2, wherein the third-named weighting function circuit is a circuit determined by the transfer function $$\frac{478.0S(S+130.0)(S^2+11.2S+60.0)(S^2+14.2S+260.0)}{(S^2+3.33S+17.0)(S^2+5.5S+140.0)(S^2+44.0S+900.0)(S^2+255.0S+2500)}$$

in which $S$ is an operator which transforms differential equations from the time domain into the complex frequency domain.

8. A device as in claim 1, wherein the third-named weighting function circuit is a circuit determined by the transfer function $$\frac{478.0S(S+130.0)(S^2+11.2S+60.0)(S^2+14.2S+260.0)}{(S^2+3.33S+17.0)(S^2+5.5S+140.0)(S^2+44.0S+900.0)(S^2+255.0S+2500)}$$

in which $S$ is an operator which transforms differential equations from the time domain into the complex frequency domain.

9. A device to measure the human comfort level resulting from vibration of a support for a human being wherein the support is adapted to produce a voltage signal proportional to the resulting acceleration, comprising means to compute the power absorbed by said human due to said acceleration and having:
  a. a weighting function circuit for weighing the acceleration as a function of frequency;
  b. means for feeding the signal to the input of the weighting function circuit;
  c. a squaring circuit connected to receive the output of the weighting function circuit; and
  d. means receiving the squaring circuit output for indicating average power absorbed by said human because of subjection to said vibration.

10. A device as in claim 9, wherein the weighting function circuit is determined by the transfer function $$\frac{15.453S(S+5.0)(S^2+28.3S+2800)(S^2+105.0S+7570)}{(S+6.0)(S^2+29.8S+1000)(S^2+39.1S+3800)(S^2+125.0S+5180)}$$

in which $S$ is an operator which transforms differential equations from the time doman into the complex frequency domain.

11. A device as in claim 9, wherein the weighting function circuit is determined by the transfer function $$\frac{209.0S(S+110.0)}{(S^2+17.6S+125.0)(S^2+110.0S+1300)}$$

in which $S$ is an operator which transforms differential equations from the time domain into the complex frequency domain.

12. A device as in claim 9, wherein the weighting function circuit is determined by the transfer function $$\frac{478.0S(S+130.0)(S^2+11.2S+60.0)(S^2+14.2S+260.0)}{(S^2+3.33S+17.0)(S^2+5.5S+140.0)(S^2+44.0S+900.0)(S^2+255.0S+2500)}$$

in which $S$ is an operator which transforms differential equations from the time domain into the complex frequency domain.

* * * * *